(12) United States Patent
Ogawa

(10) Patent No.: US 7,899,574 B2
(45) Date of Patent: Mar. 1, 2011

(54) MACHINE-TOOL CONTROLLER

(75) Inventor: Tetsuo Ogawa, Yamatokoriyama (JP)

(73) Assignee: Mori Seiki Co., Ltd., Yamatokoriyama-shi, Nara (JP)

( * ) Notice: Subject to any disclaimer, the term of this patent is extended or adjusted under 35 U.S.C. 154(b) by 744 days.

(21) Appl. No.: 11/870,149

(22) Filed: Oct. 10, 2007

(65) Prior Publication Data

US 2008/0086220 A1    Apr. 10, 2008

(30) Foreign Application Priority Data

Oct. 10, 2006    (JP) .............................. 2006-276447

(51) Int. Cl.
*G06F 19/00*    (2006.01)
(52) U.S. Cl. ........................ 700/178; 700/159; 700/174; 700/177; 700/179; 700/180
(58) Field of Classification Search ................. 700/159, 700/174, 177, 178, 180
See application file for complete search history.

(56) References Cited

U.S. PATENT DOCUMENTS

| | | | |
|---|---|---|---|
| 5,315,523 A * | 5/1994 | Fujita et al. ................. | 700/180 |
| 6,754,555 B2 * | 6/2004 | Yamato ....................... | 700/178 |
| 2005/0209728 A1 * | 9/2005 | Ogata et al. ................. | 700/182 |
| 2005/0283270 A1 * | 12/2005 | Nakamura .................. | 700/178 |

FOREIGN PATENT DOCUMENTS

JP    5-19837 A    1/1993

* cited by examiner

*Primary Examiner*—Albert Decady
*Assistant Examiner*—Sunray R Chang
(74) *Attorney, Agent, or Firm*—Westerman, Hattori, Daniels & Adrian, LLP

(57) ABSTRACT

Machine-tool controller (1) having: a drive control unit (13) controlling, based on moving-body operational commands, feed-mechanism actuation to control moving-body move-to points; a modeling data storage (15) storing moving-body and structural-element modeling data; and a screen display processor (20) for generating, based on the moving-body move-to points, data modeling the moving body having been moved into a move-to point, and for generating, and displaying on a screen display device (47) screen, image data in accordance with the modeling data generated. The screen display processor (20) generates and displays the image data in such a manner that a display-directing point, serving as a referent for displaying the moving body and being defined to be on that portion of the moving body where there is a risk of interference with the structural element, coincides with the central portion of the screen display device (47) screen.

8 Claims, 11 Drawing Sheets

Fig. 3

| Main spindle | | Group 1 | Interference relationship |
|---|---|---|---|
| Chuck | | Group 1 | Interference relationship |
| Workpiece | | Group 1 | Cutting relationship |
| First saddle | | Group 2 | Interference relationship |
| Second saddle | | Group 2 | Interference relationship |
| Upper tool rest | | Group 2 | Interference relationship |
| Tool | Tool body | Group 2 | Interference relationship |
| | Tip (blade) | Group 2 | Cutting relationship |
| Third saddle | | Group 3 | Interference relationship |
| Lower tool rest | | Group 3 | Interference relationship |
| Tool | Tool body | Group 3 | Interference relationship |
| | Blade | Group 3 | Cutting relationship |

MACHINE-TOOL CONTROLLER

BACKGROUND OF THE INVENTION

1. Technical Field

In machine tools furnished with a moving body, with a feed mechanism for driving the moving body to move it, with a structural element placed in the region in which the moving body travels, and with a screen display means for displaying image data, the present invention relates to machine-tool controllers that in accordance with movements of the moving body generate image data of the moving body and the structural element, and onscreen display the image data on the screen display means.

2. Description of the Related Art

Such machine-tool controllers known to data include the example disclosed in Japanese Unexamined Pat. App. Pub. No. H05-19837. This machine-tool controller is set up in a lathe provided with, for example, first and second main spindle for holding workpieces, first and second tool rests for holding tools, a feed mechanism for moving the first and second tool rests in predetermined feed directions, and a display for displaying image data of the workpieces and tools onscreen.

In a situation in which, for example, a workpiece in the first main spindle is machined with a tool in the first tool rest, and a workpiece in the second main spindle is machined by a tool in the second tool rest, the machine-tool controller splits the onscreen display area of the display into two display zones to display on one of the two display zones the workpiece in the first main spindle and the tool in the first tool rest, and on the other, the workpiece in the second main spindle and the tool in the second tool rest.

Therein, in displaying the tools on the display screen, the controller recognizes operational commands for the tools (tool rests) from a machining program, and generates image data showing the situation in which the tools have been moved into move-to points involving the recognized operational commands and onscreen displays the image data in the respective display zones. Furthermore, this implementation is configured to display the workpieces continuously in the midportions of the display zones, in an immobilized state, and, due to limitations of the onscreen display area of the display, to display the tools onscreen only when present within prescribed regions in the proximity of the workpieces.

A machine-tool operator views the display screen to check on the tool operations, whereby the positional relationships between the tools and the workpieces, the status of tool movement, and the status of the machining of the workpieces by the tools can be verified, to check whether the tools and workpieces will interfere with each other.

Patent Document 1: Japanese Unexamined Pat. App. Pub. No. H05-19837.

A problem with the foregoing conventional machine-tool controller, however, is that in situations in which the tools are at a distance from the workpieces, because only the workpieces are displayed on the display screen and the tools are not displayed, the operator is unable to be aware of what sort of conditions the tools are under, leaving the operator feeling uneasy. While it would be assumed that if the tools and workpieces are apart from each other, ordinarily there is no risk of their interfering, still, it would be advantageous for an operator to always be able to check on the status of the tools. A further problem is that in situations in which a tool is machining the extremities of a workpiece, for example, it can happen that the machined portion of the workpiece is displayed at an edge portion of the display area, which is prohibitive of checking on the machined portion.

BRIEF SUMMARY OF THE INVENTION

An object of the present invention brought about taking into consideration the circumstances described above, is to make available a machine-tool controller that allows the operator to work with greater peace of mind.

To achieve this object, a machine-tool controller according to a preferred aspect of the present invention is a controller provided in a machine tool including one moving body, a feed mechanism that drives the moving body to move it, one or more structural elements placed within a region in which the moving body can travel, and a screen display means that displays image data, the machine-tool controller comprising: a control execution processing unit that controls, based on an operational command for the moving body, actuation of the feed mechanism to control at least a move-to point of the moving body; a modeling data storage in which modeling data relating to two-dimensional or three-dimensional models of, and including geometry data defining shapes of, the moving body and structural element, is stored; and a screen display processor that receives from the control execution processing unit the moving body move-to point to generate, based on the received move-to point, and on the modeling data stored in the modeling data storage, modeling data describing the situation in which the moving body has been moved into the move-to point, and generates two-dimensional or three-dimensional image data in accordance with the generated modeling data to allow the screen display means to display the generated image data onscreen, the screen display processor being configured to, in generating the image data so as to be onscreen, generate the image data to display it onscreen so that a display-directing point that is a point as the basis for displaying the moving body onscreen and is predefined in a part, on the moving body, having a provability of interfering with the structural element, coincides with the center of the onscreen display area of the screen display means.

With the machine-tool controller according to this aspect of the present invention, the modeling data relating to two-dimensional or three-dimensional models of, and including at least the geometry data defining the shapes of, the moving body and structural element, is previously generated as appropriate, and then stored in the modeling data storage.

Specifically, examples of the moving bodies and structural elements may include, if the machine tool is a lathe, the bed, the headstock disposed on the bed, the main spindle rotatably supported by the headstock, the chuck that mounted to the main spindle to hold the workpiece, the workpiece, the saddle moveably disposed on the bed, the tool rest disposed on the saddle and holding the tool, the tool, the tailstock moveably disposed on the bed, and the tailstock spindle held in the tailstock. Or, if the machine tool is a machining center, for instance, the bed, the column disposed on the bed, the spindle head moveably supported on the column, the main spindle rotatably supported by the spindle head to hold the tool, the tool, and the table moveably disposed on the bed to hold the workpiece are also examples of the moving bodies and structural elements. Moreover, covers and guards are also typically provided to the machine tool in order to prevent the intrusion of chips and cutting fluid, so these covers and guards are also examples of the moving bodies and structural elements.

The modeling data for all the moving bodies and structural elements making up the machine tool, however, is not necessarily stored, so at least modeling data for those of the moving bodies and structural elements to be displayed on the screen of the screen display means may be stored. Specifically, for example, in a lathe, to display a tool and workpiece onscreen, the modeling data for the tool and workpiece may be stored, and to display onscreen a tool rest, tool, headstock, main spindle, chuck, workpiece, tailstock and tailstock spindle, the modeling data for them may be stored. Moreover, for example, in a machining center, to display a tool and workpiece onscreen, likewise the modeling data for the tool and workpiece may be stored, and to display onscreen a spindle head, main spindle, tool, table and workpiece, the modeling data for them may be stored.

The modeling data may be generated as large as, and may be generated so as to be slightly larger than, the actual moving body and structural element.

And, when the moving body is moved with at least the move-to point being controlled, as a result of the feed mechanism actuation under the control of the control processing unit, on the basis of the operational commands involving an automatic operation and a manual operation for the moving body, the screen display processor executes a process of generating, based on the moving body move-to point received from the control execution processing unit, and on the modeling data stored in the modeling data storage, the modeling data describing the situation in which the moving body has been moved into the move-to point to allow the screen display means to display onscreen the two-dimensional of three-dimensional image data in accordance with the generated modeling data.

Additionally, the image data is of a form designed so that the display-directing point that is a point as the basis for displaying the moving body onscreen and is predefined in a part, on the moving body, having a probability of interfering with the structural element, coincides with the center of the onscreen display area of the screen display means. Owing to this data formation, that part, on the moving body, having a probability of interfering with the structural element, is always displayed on the center of the display screen of the screen display means.

Furthermore, if for example the moving body is a tool, the display-directing point presumably would be defined in a tip-end position on the tool, and if the moving body is a saddle, tool rest, tailstock, tailstock spindle, spindle head, main spindle, table, or workpiece, the display-directing point would be defined in a position on an endface or at center of gravity of the given item. But the display-directing point is not limited to these locations, and may be defined anywhere as long as it is an area that enables effective display of the moving body—such as the external surface of the moving-body feature where there is a risk of interference with the structural element, or a region in the interior of that feature.

As just described, the machine-tool controller involving the present invention has a configuration in which the screen display processor generates image data formed so that the display-directing point for the moving body coincides with the center of the onscreen display area of the image displaying means to allow the screen display means to display it onscreen. This configuration enables displaying always on the center of the display screen of the screen display means the part, on the moving body, having a probability of interfering with the structural element, even if a distance is put between the moving body and the structural element, so that operators can view the display screen of the screen display means to always grasp the positional relationship between the moving body and the structural element, movement of the moving body, and the progress in machining the workpiece with the tool. Therefore, operators can always ascertain whether or not the moving body and structural element will interfere with each other, to perform operations with peace of mind.

It should be understood that the controller may be provided in a machine tool comprising a plurality of moving bodies. In such a controller, the screen display processor is configured to, in generating the image data so as to be onscreen, check if there is movement in the plurality of moving bodies, based on the generated modeling data, and when determining that several of the moving bodies are traveling, split the onscreen display area of the screen display means into a plurality of display zones so that the determined several moving bodies are displayed respectively on the split display zones, and generate the image data to display it onscreen so that the centers of the split display zones coincide respectively with display-directing points that are points as the basis for displaying the moving bodies onscreen and are predefined in parts, on the determined several moving bodies, having a probability of interfering with the structural elements, and on the other hand, when determining that one of the moving bodies is traveling, generate the image data to display it onscreen so that the center of the onscreen display area coincides with a display-directing point that is a point as the basis for displaying the determined moving body onscreen and is predefined in a part, on the determined moving body, having a probability of interfering with the structural elements.

In such a configuration, when movement of several of the moving bodies is determined, the onscreen display area of the screen display means is split into a plurality of display zones so that the determined several moving bodies are displayed respectively in the split display zones, and the image data is generated and displayed so that the centers of the split display zones coincide with the display-directing points for the determined several moving bodies, and when movement of one of the moving bodies is determined, the image data is generated and displayed so that the center of the onscreen display area of the screen display means coincides with the display-directing point for the determined one moving body. Therefore, likewise as described above, operators can always ascertain whether or not the moving bodies and structural elements will interfere with each other, to perform operations with peace of mind.

Moreover, the screen display processor is configured to externally receive two signals: a display-format identifying signal relating to in which display formats the display screen is displayed on the screen display means of a first display format in which several of the moving bodies are displayed on the screen display means and a second display format in which one of the moving bodies is displayed on the image displaying means, and a moving body-identifying signal relating to which of the moving bodies is displayed when displayed in the second display format. Furthermore, the screen display processor may be configured to, in generating the image data so as to be onscreen, recognize in which of the display formats the image data is to be displayed, based on the display-format identifying signal, and when the recognized display format is the first one, split the onscreen display area of the screen display means into a plurality of display zones so that the several moving bodies are displayed respectively on the split display zones, and then generate the image data to display it onscreen so that the centers of the split display zones coincides with the display-directing points that are points as the basis for displaying the several moving bodies onscreen and is predefined in parts, on the several moving bodies, having a probability of interfering with the structural elements, and on the other hand, when the recognized display format is the second one, further recognize which of the moving bodies is to be displayed, based on the moving body-identifying signal, and then generate the image data to display it onscreen so that the center of the onscreen display area of the image displaying means coincides with the display-directing point that is a point for displaying onscreen the recognized moving body and is predefined in a part, on the recognized moving body, having a probability of interfering with the structural elements.

In such a configuration, in the first display format, the onscreen display area of the image displaying means is split into a plurality of display zones so that the several moving bodies are displayed respectively in the display zones, and the image data is generated to be onscreen so that the centers of the split display zones coincide with the display-directing points for the several moving bodies, and in the second display format, the image data is generated to be onscreen so that the center of the onscreen display area of the screen display means coincides with the display-directing point for one of the moving bodies, selected for display. This configuration also, in the same way as described earlier, enables operators to continually grasp where the moving bodies are present, and to perform operations with peace of mind.

Also feasible is a configuration in which the controller further comprises a display-directing-point setting processor that defines the display-directing points for the moving bodies, and the screen displaying processing unit is configured to, in generating the image data so as to be onscreen, generate the image data to display it onscreen, based on the display-directing pointes defined by the display-directing-point setting processor. Such a configuration enables the operators to define the display-directing points at anywhere they like and to change them as appropriate, improving usability—for example, the display-directing points can be defined based on a signal the operators enter externally to the display-directing-point setting processor.

Additionally, acceptable is a configuration in which the controller further comprises an interference lookout processor that receives from the control execution processing unit the move-to points of the moving bodies, and, based on the received move-to points, and on the modeling data stored in the modeling data storage, generates the modeling data describing the situation in which the moving bodies have been moved into the move-to points to check whether or not the moving bodies and structural elements will mutually interfere, and if determining that they will interfere, recognizes interference points, on the moving bodies, having a probability of interfering with the structural elements, based on the generated modeling data, to send to the display-directing-point setting processor the recognized interference points, as well as send to the control execution processing unit an alarm signal; the display-directing-point setting processor is configured to, when receiving the interference points, define the display-directing points at the interference points, based on the received interference points, and the control execution processing unit is configured to, when receiving the alarm signal from the interference lookout processor, stop the movement of the moving bodies.

In such a configuration, when the moving bodies are moved, as a result of the feed mechanism actuation under the control of the control execution processing unit, the interference lookout processor executes a process of generating modeling data describing the situation in which the moving bodies have been moved into the move-to points, based on the move-to points received from the control execution processing unit and the modeling data stored in the modeling data storage, to check whether or not the moving bodies and structural elements will mutually interfere.

Whether or not the moving bodies and structural elements will mutually interfere is determined based on, for example, whether or not there are portions where the modeling data for the moving bodies contacts or overlaps with the modeling data for the structural elements. If such an overlapping or contacting portion is created between the moving bodies' modeling data and the structural elements' modeling data, it is determined that the moving bodies and structural elements will interfere. Additionally, in a situation in which the moving bodies and structural elements are tools and workpieces respectively, and the modeling data of the tools and that of the workpieces overlap with each other, it is determined that the tools and workpieces will mutually interfere, except when the overlapping portion is created between the blades of the tools and workpieces.

When it is determined from the results of the interference lookout that the moving bodies and structural elements will interfere, the interference points, on the moving bodies, having a probability of interfering with the structural elements, is recognized based on the generated modeling data, and then the recognized interference points are sent to the display-directing-point setting processor, as well as the alarm signal is sent to the control execution processing unit. Receiving the interference points, the display-directing-point setting processor defines, based on the received interference points, the display-directing points at the interference points, on the moving bodies, having a probability of interfering with the structural elements. Receiving the alarm signal, the control execution processing unit stops the feed mechanism actuation to halt the movement of the moving bodies.

As just described, receiving the interference points, the display-directing-point setting processor defines the display-directing points at the interference points, on the moving bodies, having a probability of interfering with the structural elements, to display on the center of the display screen of the screen display means the interference points on the moving bodies, so that the interference points are more quickly identified, and the efficiency of the operators' work is improved.

Also feasible is a configuration in which the controller is further comprises a move-to point predicting unit that receives from the control execution processing unit at least current points of the moving bodies to predict from the received current points the move-to points into which the moving bodies will be moved after a predetermined period of time passes, and the screen display processor and interference lookout processor are configured to, in generating modeling data describing the situation in which the moving bodies have been moved, receive from the move-to point predicting unit the predicted move-to points for the moving bodies to generate, based on the received predicted move-to points, and on the modeling data stored in the modeling data storage, the modeling data describing the situation in which the moving bodies have been moved into the predicted move-to points.

In such a configuration, based on the move-to points, predicted by the move-to point predicting unit, and into which the moving bodies will be moved after the predetermined period of time passes, the image data is generated to be onscreen, and whether or not the moving bodies and structural elements will mutually interfere is checked, so that before the moving bodies are actually moved by the feed mechanism drive under the control of the control execution processing unit, the positional relationship between the moving bodies and the structural elements, the movement of the moving bodies, and a probability of interference occurrences can be previously checked. Therefore, this configuration is advantageous in performing various operations—for example, interference is reliably prevented from occurring.

Herein, the move-to points can be predicted, for example, from the current points and speeds of the moving bodies, and from current points of the moving bodies, the operational commands, for the moving bodies, obtained by analyzing the machining program, and the operational commands, for the moving bodies, involving the manual operation.

As described above, configured to generate moving body-based image data so as to be onscreen, not conventional workpiece (structural element)-based image data, the machine-tool controller involving the present invention enables displaying always onscreen the interference points, on the moving bodies, having a probability of interfering with the structural elements, regardless of the distance between the moving bodies and the structural elements, so that the operators can grasp continually the positional relationship between the moving bodies and structural elements, the movement of the moving bodies, and progress in machining the workpieces, to work always with peace of mind.

Furthermore, providing the display-directing-point setting processor to enable operators to define the display-directing points in locations of choice, or to make it so that when interference points have been received from the interference lookout processor the display-directing points are defined in locations where there is interference with the structural elements, makes it possible to improve operability. In addition, a configuration in which the moving bodies are displayed onscreen, and the interference lookout is carried out, based on the moving bodies' move-to points predicted by the move-to point predicting unit is advantageous in performing various operations, because prior to the actual movement of the moving bodies, the moving bodies is displayed onscreen, and the interference lookout is carried out.

BRIEF DESCRIPTION OF THE SEVERAL VIEWS OF THE DRAWINGS

FIG. 3 is an explanatory diagram illustrating the data structural elements of the interference data stored in the interference data storage in accordance with this embodiment.

DETAILED DESCRIPTION OF THE INVENTION

Figure 1:
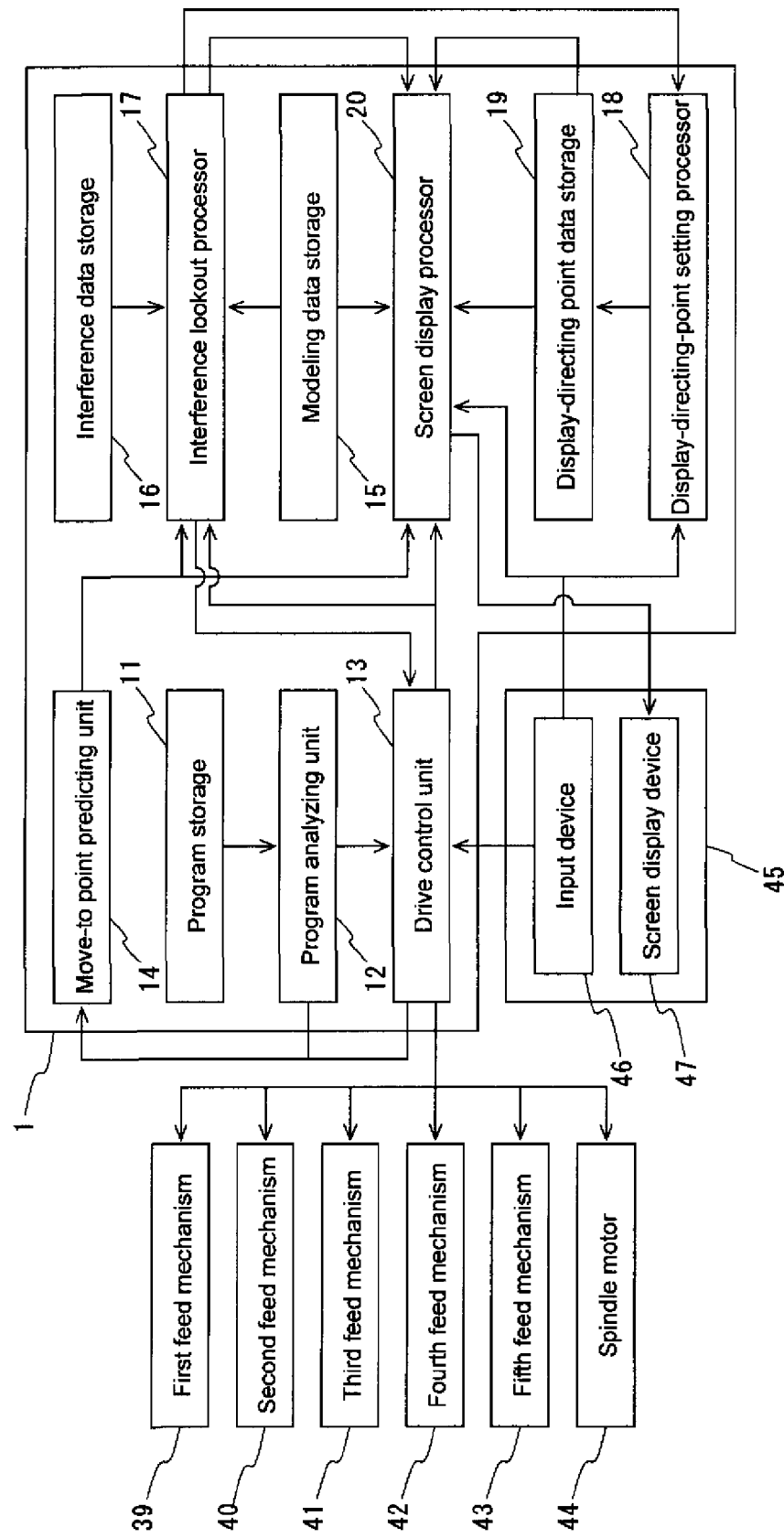
FIG. 1 is a schematic block diagram illustrating the constitution of the machine-tool controller in accordance with a first embodiment of the present invention.

A specific embodiment of the present invention is explained hereinafter with reference to the accompanying drawings. FIG. 1 is a block diagram representing a outlined configuration of a machine tool controller involving a first embodiment of the present invention.

Figure 2:
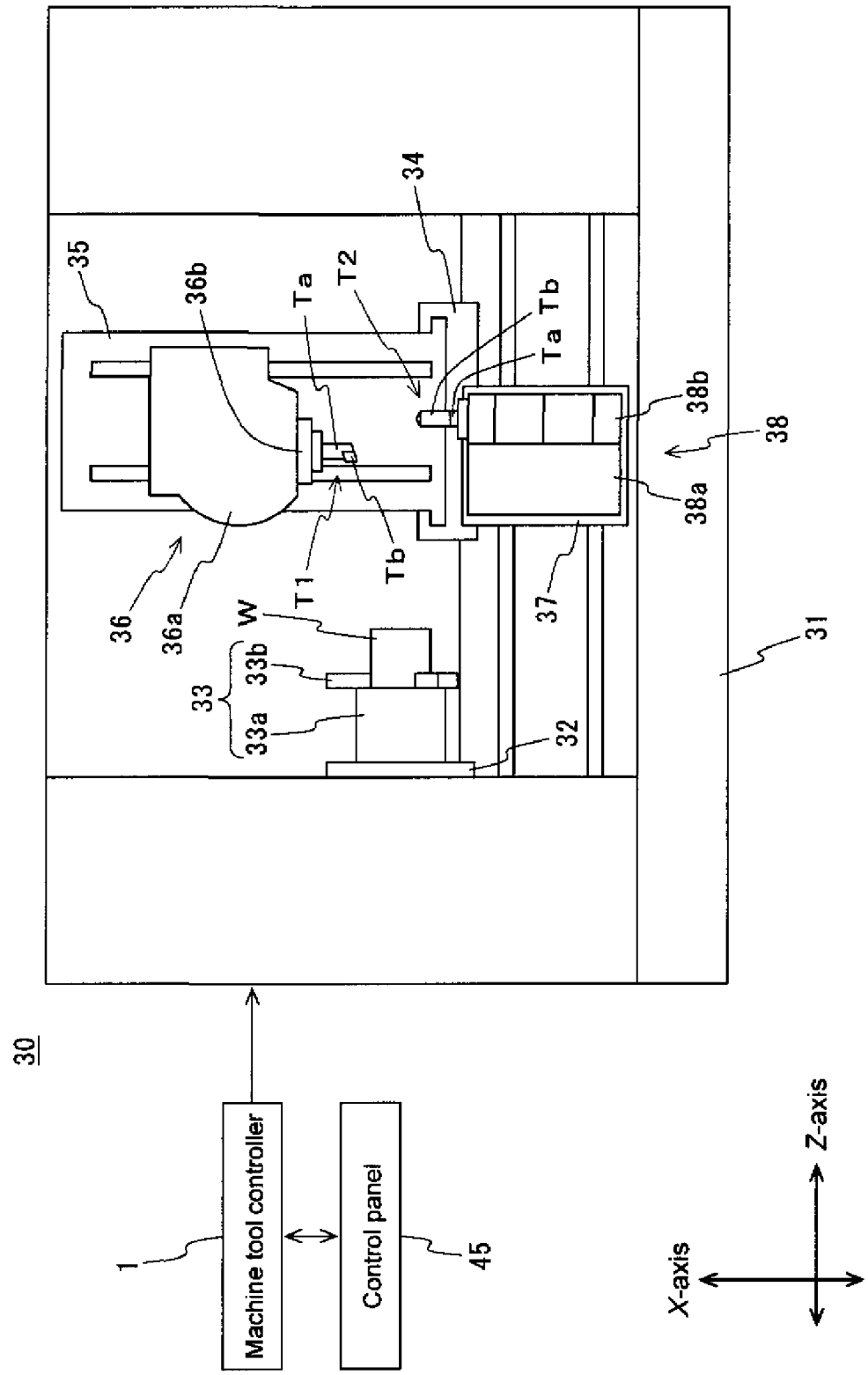
FIG. 2 is a schematic front view illustrating the constitution of a numerically-controlled (NC) lathe provided with the machine-tool controller in accordance with this embodiment.

As illustrated in FIG. 1, a machine tool controller 1 (hereinafter, refer to as controller) of this embodiment is configured with a program storage 11, a program analyzing unit 12, a drive control unit 13, a move-to point predicting unit 14, a modeling data storage 15, an interference data storage 16, an interference lookout processor 17, a display-directing-point setting processor 18, a display-directing point data storage 19 and a screen display processor 20, and is provided in a NC lathe 30 illustrated in FIG. 2.

First, the NC lathe 30 will be explained hereinafter. As illustrated in FIG. 1 and FIG. 2, the NC lathe 30 is provided with a bed 31, a (not-illustrated) headstock disposed on the bed 31, a main spindle 32 supported by the (not illustrated) headstock rotatably on the horizontal axis (on Z-axis), a chuck 33 mounted to the main spindle 32, a first saddle 34 disposed on the bed 31 movably along Z-axis, a second saddle 35 disposed on the first saddle 34 movably along the Y-axis perpendicular to Z-axis in a horizontal plane, a upper tool rest 36 disposed on the second saddle 35 movable along the X-axis orthogonal to both Y-axis and Z-axis, a third saddle 37 disposed on the bed 31 movably along the Z-axis, a lower tool rest 38 disposed on the third saddle 37 movably along the X-axis, a first feed mechanism 39 for moving the first saddle 34 along the Z-axis, a second feed mechanism 40 for moving the second saddle 35 along the Y-axis, a third feed mechanism 41 for moving the upper tool rest 36 along the X-axis, a fourth feed mechanism 42 for moving the third saddle 37 along the Z-axis, a fifth feed mechanism 43 for moving the lower tool rest 38 along the X-axis, a spindle motor 44 for rotating the main spindle 32 axially, a control panel 45 connected to the controller 1, and the controller 1 for controlling the actuation of the feed mechanisms 39, 40, 41, 42, 43 and spindle motor 44.

The chuck 33 comprises a chuck body 33a and a plurality of grasping claws 33b that grasp a workpiece W. The upper tool rest 36 is provided with a tool rest body 36a and a tool spindle 36b that holds a tool T1, and the lower tool rest 38 is provided with a tool rest body 38a and a turret 38b that holds a tool T2. Furthermore, the tool T1 is cutting tools and other turning tools, and is configured with a tool body Ta and a tip (blade) Tb for machining the workpiece W. The tool T2 set up in the lower tool rest 38 is drills, end mills and other rotating tools, and is configured with the tool body Ta and a blade Tb for machining the workpiece W.

The control panel 45 comprises an input device 46, such as an operation keys for inputting various signals to the controller 1 and a manual pulse generator for inputting a pulse signal to the controller 1, and a screen display device 47 for displaying onscreen a state of control by the controller 1.

The operation keys include an operation mode selecting switch for switching operation modes between automatic and manual operations, a feed axis selector switch for selecting feed axes (X-axis, Y-axis and Z-axis), movement buttons for moving along a feed axis selected by the feed axis selector switch the first saddle 34, second saddle 35, upper tool rest 36, third saddle 37 and lower tool rest 38, a control knob for controlling feedrate override, a display format selecting button for switching display formats for displaying a screen image on the screen display device 47 among full-screen display, spilt-screen display and selected image display, and setting buttons for defining a display-directing point that will be described hereinafter. The signals from the operation mode selecting switch, feed axis selector switch, movement buttons, control knob, display format selecting button and setting buttons are sent to the controller 1.

Figure 7A:
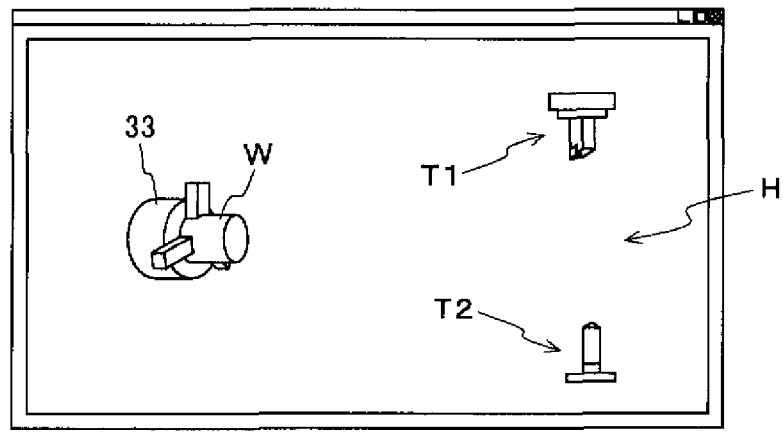
FIG. 7 is an explanatory diagram illustrating an example of a display screen generated by the screen displaying processor in accordance with this embodiment and displayed on the image display device.
Figure 7B:
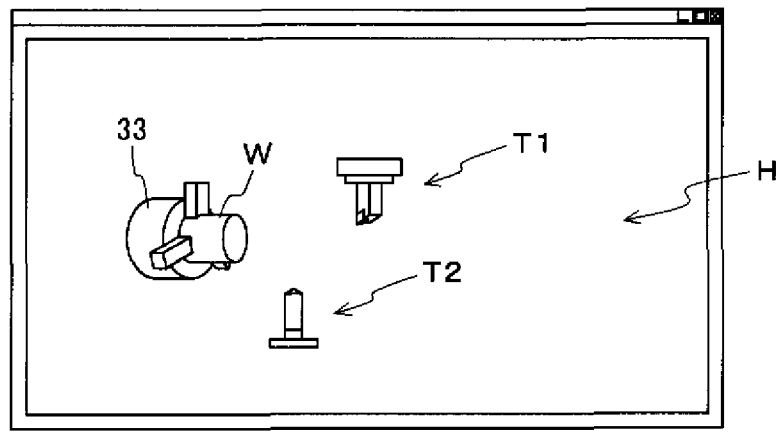
Figure 7C:
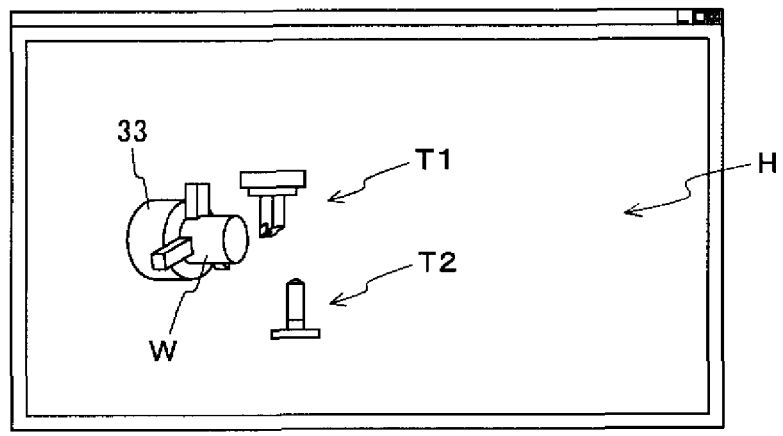

"Full-screen display" means that an image in its entirety, including, for example, the chuck 33, workpiece W, tools T1, T2, a part of the tool spindle 36b, and a part of the turret 38b, is displayed in one onscreen display area H (refer to FIG. 7). "Split-screen display" means that the onscreen display area is divided into, for example, two display zones H1, H2, and images of the tools T1, T2 are displayed respectively in the display zones (refer to FIG. 8 and FIG. 11A). "Selected image display" means that an image of whichever is selected from the tools T1, T2 is displayed in one onscreen display area H (refer to FIG. 9, FIG. 10, FIG. 11B and FIG. 11C).

The manual pulse generator is provided with the feed axis selector switch for selecting the feed axes (X-axis, Y-axis and Z-axis), a power selector switch for changing travel distance per one pulse, and a pulse handle that is rotated axially to generate pulse signals corresponding to the amount of the rotation. The operating signals from the feed axis selector switch, power selector switch, and pulse handle are sent to the controller 1.

Next, the controller 1 will be explained. As described above, the controller 1 is provided with the program storage 11, program analyzing unit 12, drive control unit 13, move-to point predicting unit 14, modeling data storage 15, interference data storage 16, interference lookout processor 17, display-directing-point setting processor 18, display-directing point data storage 19, and screen display processor 20. It should be understood that the program storage 11, program analyzing unit 12 and drive control unit 13 function as a control execution processing unit recited in the claims.

In the program storage 11, a previously created NC program is stored. The program analyzing unit 12 analyzes the NC programs stored in the program storage 11 successively for each block to extract operational commands relating to the move-to point and feed rate of the upper tool rest 36 (the first saddle 34 and second saddle 35), to the move-to point and feed rate of the lower tool rest 38 (the third saddle 37), and to the rotational speed of the spindle motor 44 to send the extracted operational commands to the drive control unit 13 and move-to point predicting unit 14.

When the operation mode selecting switch is in automatic operation position, the drive control unit 13 controls, based on the operational commands received from the program analyzing unit 12, rotation of the main spindle 32 and movement of the tool rests 36, 38. Specifically, the rotation of the main spindle 32 is controlled by generating a control signal, based on feedback data on current rotational speed from the spindle motor 44, and on the operational commands, to send the generated control signal to the spindle motor 44. Additionally, the movement of the upper tool rest 36 is controlled by generating a control signal, based on feedback data on a current point of the upper tool rest 36 from the feed mechanism 39, 40, 41, and on the operational commands, to send the generated control signal to the feed mechanisms 39, 40, 41.

And the movement of the lower tool rest 38 is controlled by generating a control signal, based on feedback data on a current point of the lower tool rest 38 from the feed mechanisms 42, 43, and on the operational commands, to send the generated control signal to the feed mechanisms 42, 43.

Furthermore, when the operation mode selecting switch is in the manual operation position, the drive control unit 13 generates, based on the operating signal received from the input device 46, operational signals for the feed mechanisms 39, 40, 41, 42, 43 to control their actuation. For example, when the movement button is pushed, the drive control unit 13 recognizes, from a selection made from feed axes by means of the feed axis selector switch, which of the feed mechanisms 39, 40, 41, 42, 43 is to be activated, and recognizes from the control exerted by means of the control knob the adjusted value of the feedrate override, to generate an operational signal including data on the recognized feed mechanisms 39, 40, 41, 42, 43, and on the movement speed in accordance with the recognized adjusted value to control the actuation of the feed mechanisms 39, 40, 41, 42, 43, based on the generated operational signals. In addition, when the pulse handle of the manual pulse generator is operated, the drive control unit 13 recognizes, from a selection made from feed axes by means of the feed axis selector switch, which of the feed mechanisms 39, 40, 41, 42, 43 is to be activated, and recognizes, from a selection made from the power by means of the power selector switch, which of the amount of travel per 1 pulse, to generate an operational signal including data on the recognized feed mechanisms 39, 40, 41, 42, 43, and on the recognized amount of travel per 1 pulse, and on the pulse signal generated by means of the pulse handle to control the actuation of the feed mechanisms 39, 40, 41, 42, 43, based on the generated operational signals.

The drive control unit 13 stops the actuation of the feed mechanisms 39, 40, 41, 42, 43 and spindle motor 44 when receiving an alarm signal sent from the interference lookout unit 17. In addition, the drive control unit 13 sends data involving the tools T1, T2 to the interference lookout processor 17 and screen display processor 20 when the tool T1 set up in the upper tool rest 36 is changed to another one, and the tool T2 indexed to the machining position for the lower tool rest 38 is changed. Also the drive control unit 13 sends to the move-to point predicting unit 14 the current points and speeds of the first saddle 34, second saddle 35, upper tool rest 36, third saddle 37 and lower tool rest 38 received the feed mechanisms 39, 40, 41, 42, 43, and the generated operational signals.

The move-to point predicting unit 14 receives from the program analyzing unit 12 the operational commands relating to the move-to points and feed rates of the tool rests 36, 38, and receives from the drive control unit 13 the current points, the current speeds, and the operational signals of the first saddle 34, second saddle 35, upper tool rest 36, third saddle 37 and lower tool rest 38, to predict, based on the received operational commands or operational signals and current points, and received current points and speeds, the move-to points into which the first saddle 34, second saddle 35, upper tool rest 36, third saddle 37, and lower tool rest 38 are moved after a predetermined period of time passes, and then the move-to point predicting unit 14 sends to the interference lookout processor 17 and screen displaying processing unit 20 the predicted move-to points, and received operational commands and operational signals. In the move-to point predicting unit 14, block operational commands leading those that will be analyzed by the program analyzing unit 12 and is processed by the drive control unit 13 are successively processed.

In the modeling data storage 15, for example, three-dimensional modeling data, previously generated as appropriate, involving at least the tools T1, T2, workpiece W, main spindle 32, chuck 33, first saddle 34, second saddle 35, upper tool rest 36, third saddle 37 and lower tool rest 38 is stored. Such three dimensional modeling data is formed, with at least geometry data defining three-dimensional shapes of the tools T1, T2, workpiece W, main spindle 32, chuck 33, first saddle 34, second saddle 35, upper tool rest 36, third saddle 37 and lower tool rest 38 being included.

The three-dimensional modeling data, which is employed as interference region when interference lookout, may be generated as large as, or so as to be slightly larger than, the actual size.

In the interference data storage 16, interference data defining interference relationships, previously determined, among the tools T1, T2, workpiece W, main spindle 32, chuck 33, first saddle 34, second saddle 35, upper tool rest 36, third saddle 37, and lower tool rest 38 is stored.

In the NC lathe 30, the main spindle 32 is held in a (not-illustrated) headstock, with the main spindle 32, chuck 33 and workpiece W being integrated, the first saddle 34 is disposed on the bed 31, with the first saddle 34, second saddle 35, upper tool rest 36 and tool T1 being integrated, and the third saddle 37 is disposed on the bed 31, with the third saddle 37, lower tool rest 38 and tool T2 being integrated. Therefore, interference relationships are not established among the main spindle 32, chuck 33 and workpiece W, among the first saddle 34, second saddle 35, upper tool rest 36 and tool T1, and among the third saddle 37, lower tool rest 38 and tool T2. The interference relationships, however, are established only among the main spindle 32, chuck 33 and workpiece W, and the first saddle 34, second saddle 35, upper tool rest 36 and tool T1, and the third saddle 37, lower tool rest 38 and tool T2.

Moreover, although the interference among the tools T1, T2, and workpiece W is regarded as machining of the workpiece W with the tools T1, T2 (that is, not regarded as interference), it is regarded as interference, not as machining, except when the interference occurs between the tip Tb of the tool T1 or between the blade Tb of the tool T2 and the workpiece W.

Therefore, specifically, as illustrated in FIG. 3, the interference data is defined as data representing which of the interference relationship and cutting relationship is established among some groups to which the tools T1, T2, workpiece W, main spindle 32, chuck 33, first saddle 34, second saddle 35, upper tool rest 36, third saddle 37 and lower tool rest 38 are classified according to what are integrated.

And, according to this interference data, the main spindle 32, chuck 33 and workpiece W are classified to a first group, the first saddle 34, second saddle 35, upper tool rest 36 and tool T1 are classified to a second group, and the third saddle 37, lower tool rest 38 and tool T2 are classified to a third group. Furthermore, no interference occurs among items in the same group, but it occurs among items belonging to different groups. Moreover, even if the interference occurs between the items belonging to the different groups, it is not regarded as interference when these items establish cutting relationship and belong to the first group 1 and the second group 2 or third group 3—that is, the items establishing the interference relationship are tip Tb of the tool T1 or blade Tb of the tool T2, and workpiece W.

The interference lookout processor 17 successively receives from the move-to point predicting unit 14 the move-to points of the first saddle 34, second saddle 35 and upper tool rest 36, the third saddle 37 and lower tool rest 38 to check, based on the received predicted move-to points, and on data stored in the modeling data storage 15 and interference data storage 16, whether or not interference occurs among the tools T1, T2, workpiece W, main spindle 32, chuck 33, first saddle 34, second saddle 35, upper tool rest 36, third saddle 37 and lower tool rest 38.

Figure 4:
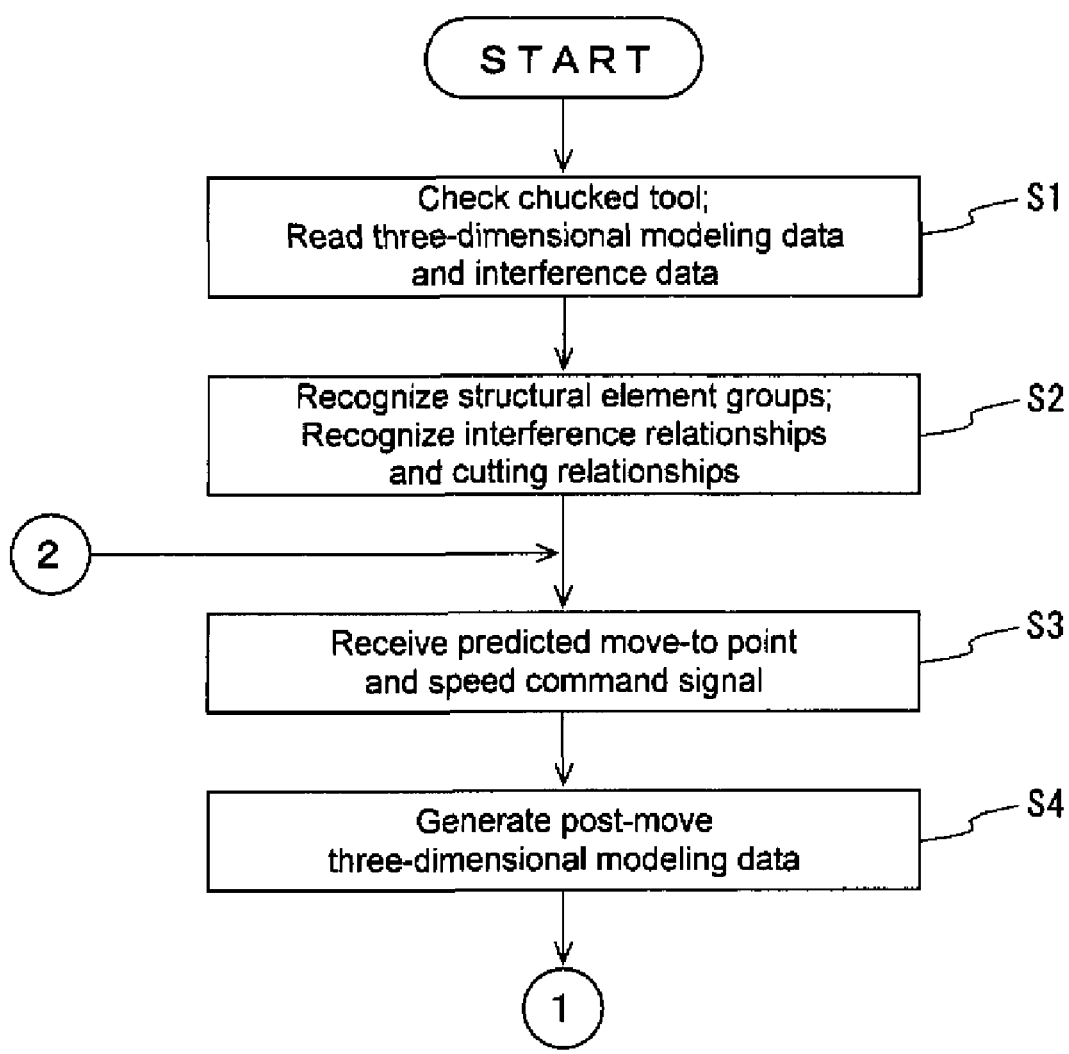
FIG. 4 is a flowchart showing a series of processes performed by the interference lookout processor in accordance with this embodiment.
Figure 5:
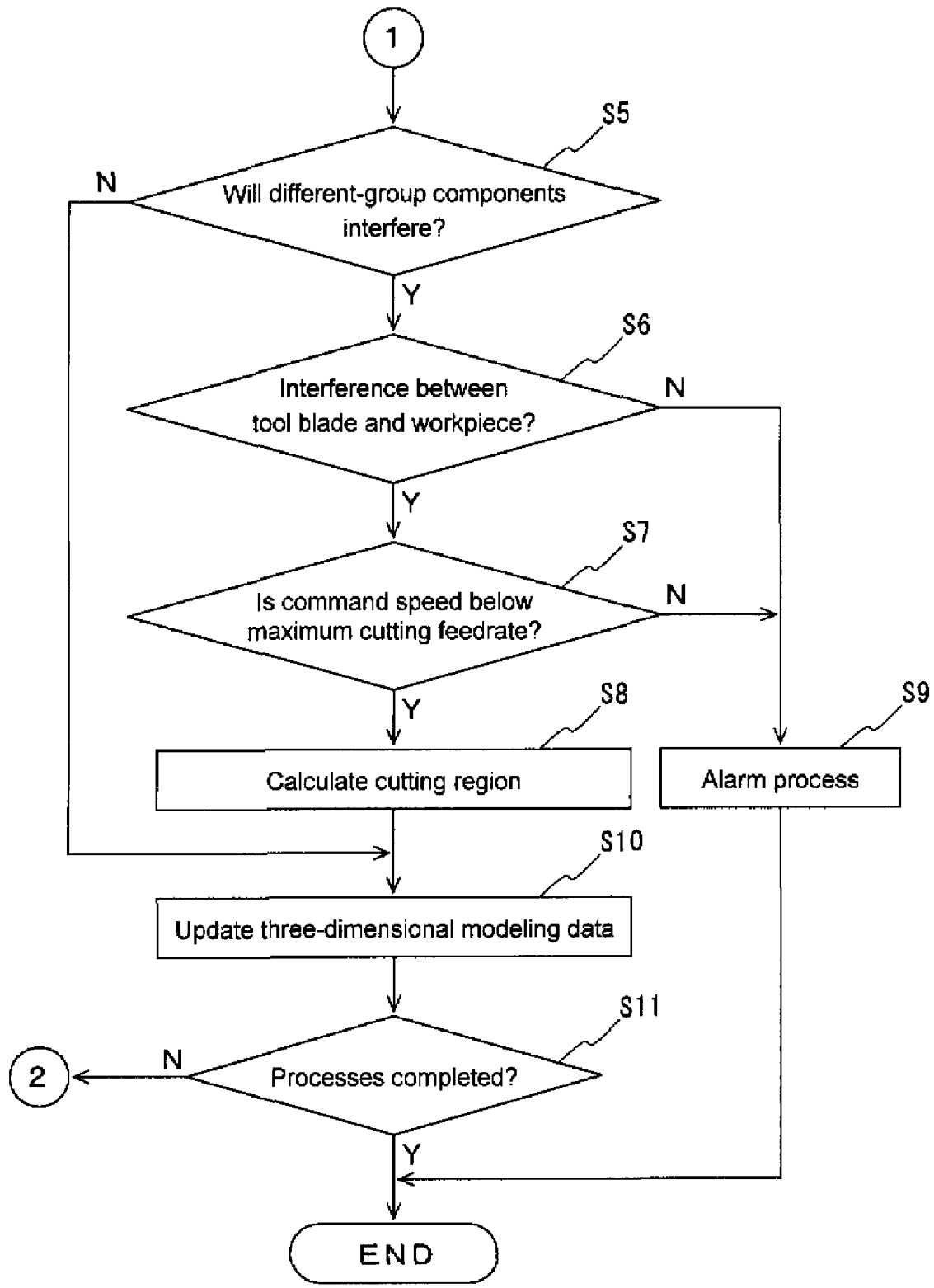
FIG. 5 is a flowchart showing a series of processes performed by the interference lookout processor in accordance with this embodiment.

Specifically, the interference lookout processor 17 is configured to successively execute a series of processes as represented in FIG. 4 and FIG. 5. First, the interference lookout processor 17 recognizes tools T1, T2 held in the tool rests 36, 38, based on the data, received from the drive control unit 13, on the tools T1, T2 held in the tool rests 36, 38, and reads the three-dimensional modeling data, stored in the modeling data storage 15, for the tool T1, T2, workpiece W, main spindle 32, chuck 33, first saddle 34, second saddle 35, upper tool rest 36, third saddle 37, and lower tool rest 38, and the interference data stored in the interference data storage 16 (Step S1). Furthermore, in order to read the three-dimensional data for the tools T1, T2, the interference lookout processor 17 reads the three-dimensional modeling data for the recognized tools T1, T2.

Next, referring to the interference data having been read, the interference lookout processor 17 recognizes to which groups the tools T1, T2, workpiece W, main spindle 32, chuck 33, first saddle 34, second saddle 35, upper tool rest 36, third saddle 37 and lower tool rest 38 belong, as well as recognize the tools T1, T2, workpiece W, main spindle 32, chuck 33, first saddle 34, second saddle 35, upper tool rest 36, third saddle 37 and lower tool rest 38 establish which of the cutting relationship and interference relationship (Step S2).

Subsequently, the interference lookout processor 17 receives from the move-to point predicting unit 14 the predicted move-to points of the tool rests 36, 38, and the operational commands and signals (a speed command signal) involving the moving speed (step S3), and generates, based on the read three-dimensional data and received predicted move-to points, three-dimensional modeling data describing the situation in which the first saddle 34, second saddle 35, upper tool rest 36 and tool T1, and the third saddle 37, lower tool rest 38 and tool T2 have been moved into the predicted move-to points (Step S4).

After that, the interference lookout processor 17 checks, based on the read interference data, and on the generated three-dimensional modeling data, whether or not the movements of the first saddle 34, second saddle 35, upper tool rest 36 and tool T1, and of the third saddle 37, lower tool rest 38 and tool T2 cause interference among the tools T1, T2, workpiece W, main spindle 32, chuck 33, first saddle 34, second saddle 35, upper tool rest 36, third saddle 37 and lower tool rest 38—that is, whether or not there is a contacting or overlapping portion in the three-dimensional modeling data for the items belonging to the different groups (among the three-dimensional modeling data for the main spindle 32, chuck 33 and workpiece W belonging to the first group, that of the first saddle 34, second saddle 35, upper tool rest 36 and tool T1 belonging to the second group, and that of the third saddle 37, lower tool rest 38 and tool T2 belonging to the third group) (Step S5).

When determining in Step S5 that there is contacting or overlapping portion, the interference lookout processor 17 checks whether or not the contacting or overlapping occurs between items establishing a cutting relationship, and whether or not the contacting or overlapping belongs to the first group and the second group or third group, namely whether or not it occurs between the tip Tb of the tool T1 or the blade Tb of the tool T2 and the workpiece W (Step S6).

The interference lookout section 17 checks whether or not the received command speed is within the maximum cutting feed rate (Step S7).

When determining that the command speed is within the maximum cutting feed rate, the interference lookout processor 17 defines that machining the workpiece W with the tools T1, T2 causes the contacting or overlapping in the three-dimensional modeling data, and calculates the overlapping portion (interference (cutting) area) (Step S8).

On the other hand, when determining in Step S6 that the contacting or overlapping does not occur between items establishing cutting relationship (it does not occur between the tip Tb of the tool T1 or the blade Tb of the tool T2 and the workpiece W), the interference lookout processor 17 defines that interference occurs among the main spindle 34, chuck 33 and workpiece W, and the first saddle 34, second saddle 35, upper tool rest 36 and tool T1, and the third saddle 37, tower tool rest 38 and tool T2. Additionally, when determining in Step S7 that the command speed exceeds the maximum cutting feed rate, the interference lookout processor 17 does not regard the contacting or overlapping as machining of the workpiece W with the tools T1, T2, but define that interference occurs, and sends the alarm signal to the drive control unit 13 and screen display processor 20 (Step S9) to end the series of the processes.

Moreover, in Step S9, when the tools T1, T2 interfere with the workpiece W, chuck 33, tool spindle 36b and turret 38b, the interference lookout processor 17 recognizes an interference point at where the tool T1 interferes with the workpiece W, chuck 33, tool T2 and turret 38b, and an interference point at where the tool T2 interferes with the workpiece W, chuck 33, tool T1 and tool spindle 36b, and sends the recognized interference points to the display-directing-point setting processor 18. It is because only the chuck 33, workpiece W, tools T1, T2, part of the tool spindle 36b, and part of the turret 38b are displayed on the screen display device 47 that the transmission of the interference points limited to when the tools T1, T2 interfere with the workpiece W, chuck 33, tool spindle 36b, and turret 38b.

When determining in Step S5 that there is no contacting or overlapping (no interference occurs), the interference lookout processor 17 proceeds to Step S10 after finishing the process in Step S8, and updates the three-dimensional modeling data read in Step S1 by the three-dimensional modeling data generated in Step S4. And if there is a cutting portion between the tools T1, T2 and the workpiece W, the interference lookout processor 17 updates the three-dimensional modeling data for the workpiece W to delete the cutting portion calculated in Step S8.

Subsequently, in Step S11, the interference lookout processor 17 checks whether or not the processes are finished, and if they are not finished, repeats step S3 or later steps. If the processes are finished, above series of processes end.

The display-directing-point setting processor 18 defines, based on an input signal from the setting buttons on the input device 46, a point (display-directing point) as the basis for displaying the tools T1, T2 onscreen in a part, on the tool T1, having a probability of interfering with the workpiece W, main spindle 32, chuck 33, third saddle 37, lower tool rest 38 and tool T2, and in a part, on the tool T2, having a probability of interfering with the workpiece W, main spindle 32, chuck 33, first saddle 34, second saddle 35, upper tool rest 36 and tool T1, and stores in the display-directing point data storage 19 data on defined display-directing points for the tools T1, T2. It should be understood that the display-directing points are defined at the tips of the tools T1, T2 in this embodiment.

When receiving the interference points from the interference lookout processor 17, the display-directing-point setting processor 18 defines, based on the received interference points, the display-directing points at the interference point, on the tool T1, having a probability of interfering with the workpiece W, chuck 33, tool T2, turret 38b, and at a point, on the tool T2, having a probability of interfering with the workpiece W, chuck 33, tool T1, and tool spindle 36b, and stores in the display-directing point data storage 19 data on the defined display-directing points for the tools T1, T2 to update the display-directing points defined based on the input signals through the input device 46.

The screen display processor 20 successively receives from the move-to point predicting unit 14 the predicted move-to points for the first saddle 34, second saddle 35 and upper tool rest 36, and the third saddle 37 and lower tool rest 38, and generates three-dimensional image data, based on the received predicted move-to points and data stored in the modeling data storage 15 and display-directing point data storage 19 to display the generated three-dimensional image data on the screen display device 47.

Figure 6:
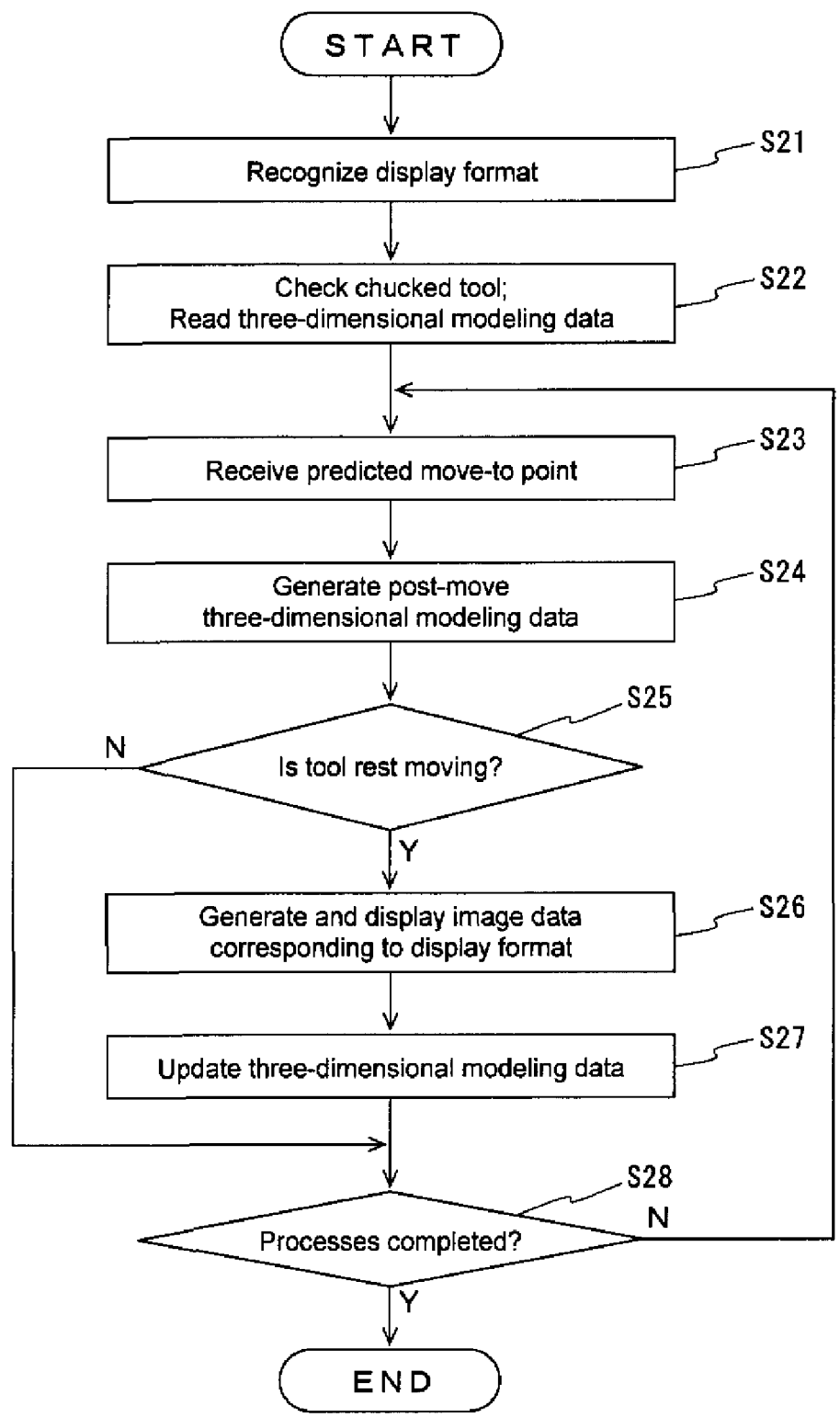
FIG. 6 is a flowchart showing a series of processes performed by the screen displaying processor in accordance with this embodiment.
Figure 8A:
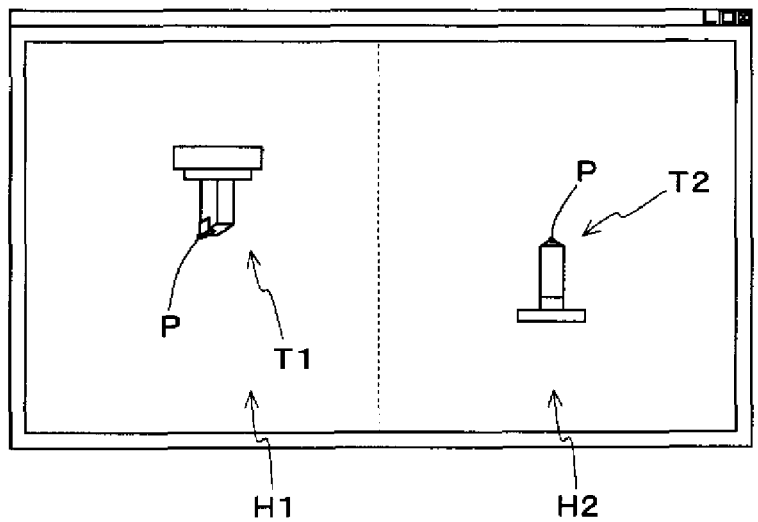
FIG. 8 is an explanatory diagram illustrating an example of a display screen generated by the screen displaying processor in accordance with this embodiment and displayed on the image display device.
Figure 8B:
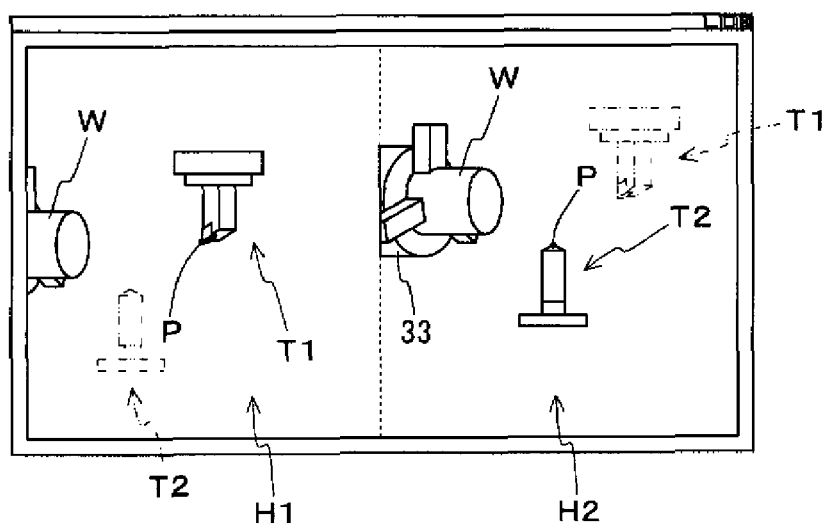
Figure 8C:
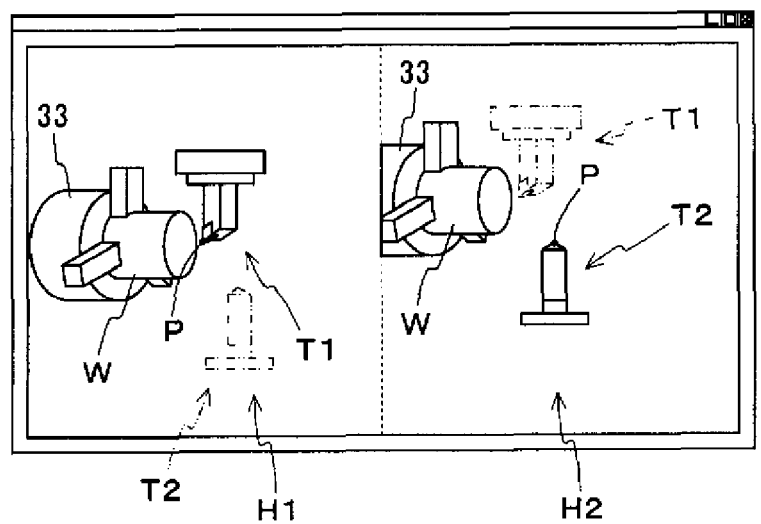
Figure 9A:
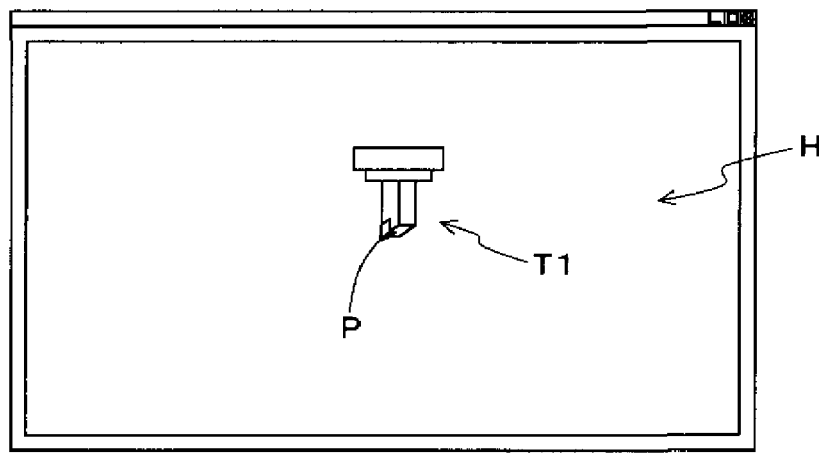
FIG. 9 is an explanatory diagram illustrating an example of a display screen generated by the screen displaying processor in accordance with this embodiment and displayed on the image display device.
Figure 9B:
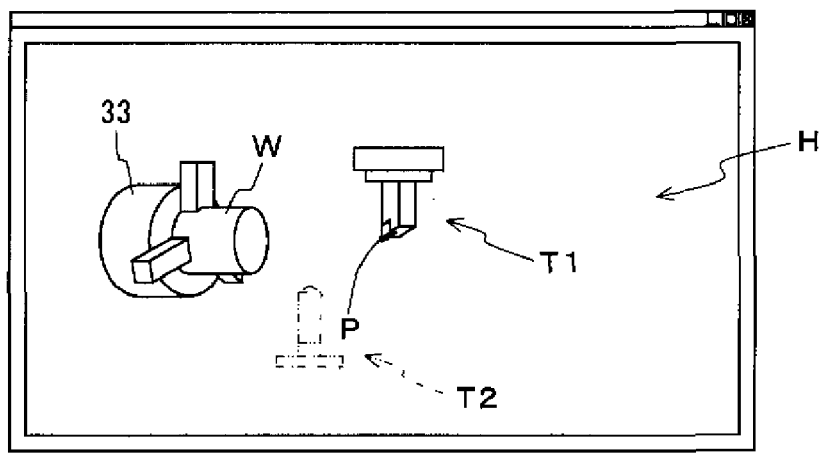
Figure 9C:
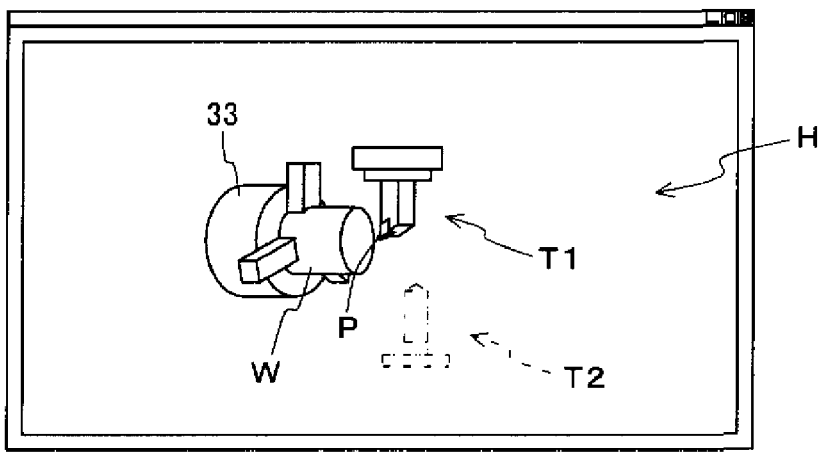
Figure 10A:
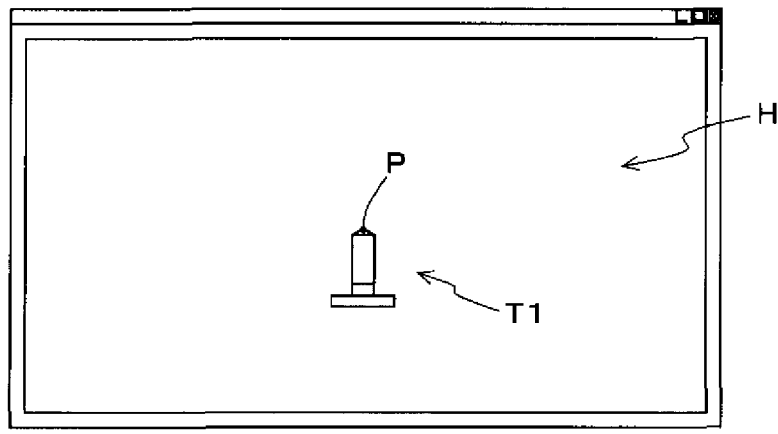
FIG. 10 is an explanatory diagram illustrating an example of the display screen generated by the screen displaying processor in accordance with this embodiment and displayed on the image display device.
Figure 10B:
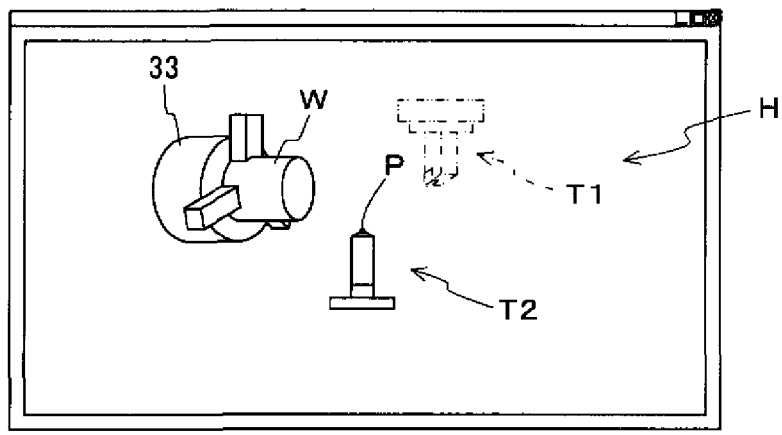
Figure 10C:
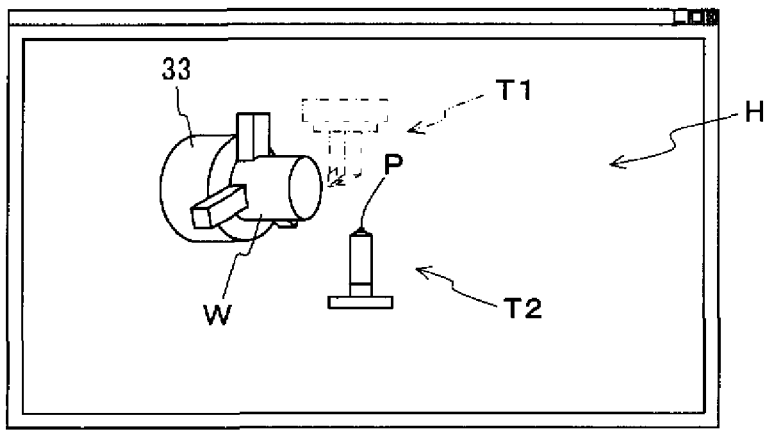
Figure 11A:
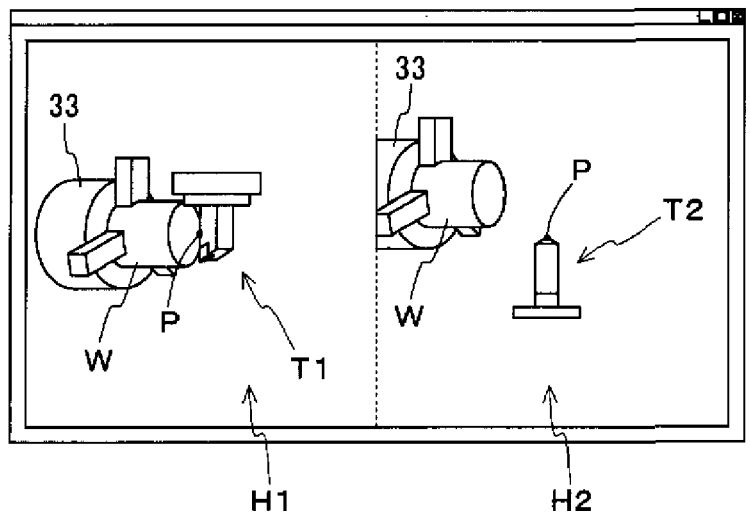
FIG. 11 is an explanatory diagram illustrating an example of the display screen generated by the screen displaying processor in accordance with this embodiment and displayed on the image display device.
Figure 11B:
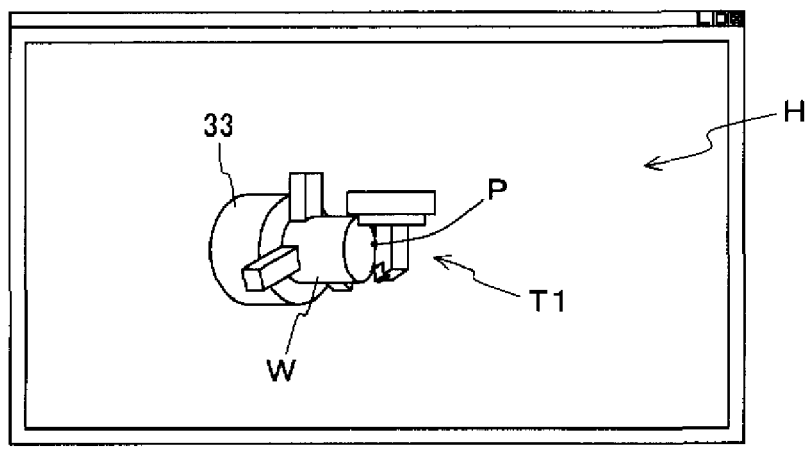
Figure 11C:
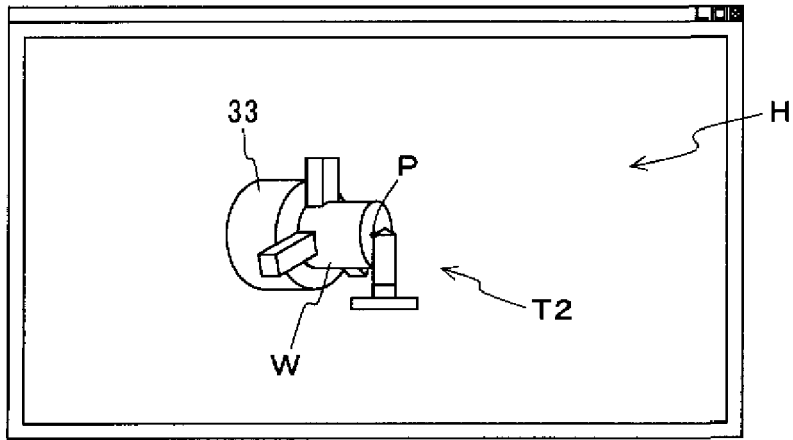

Specifically, the screen display processor 20 successively executes a series of processes as represented in FIG. 6. In the full-screen display, the screen displaying processing unit 20 generates image data involving an entire image of the chuck 33, workpiece W, tools T1, T2, part of the tool spindle 36b, and part of the turret 38b, as illustrated in FIG. 7, to display the image data on one onscreen display area H of the screen display device 47. In the split-screen display (the first display format), for example, as illustrated in FIG. 8 and FIG. 11A, the screen displaying processing unit 20 splits the onscreen display area of the screen display device 47 into two display zones H1, H2, and generates image data to display it in the display zones H1, H2 so that the display-directing points P coincide respectively with the centers of the display zones H1, H2. In the selected image display (the second display format), for example, as illustrated in FIG. 9, FIG. 10, FIG. 11B and FIG. 11C, the screen displaying processing unit 20 generates image data to display it on the screen display device 47 so that the display-directing point P of whichever is selected from the tools T1, T2 coincides with the center of the onscreen display area H of the screen display device 47. It should be understood that the FIG. 9 and FIG. 11B illustrate the tool T1 displayed in the selected image display, and FIG. 10 and FIG. 11C illustrate the tool T2 displayed in selected image display.

Furthermore, the screen display processor 20 accepts the display-format identifying signal and moving body-identifying signal input through the display format selecting button on the input device 46 to recognize, based on the accepted display-format identifying signal, in which of formats screen is displayed, of the full-screen display, split-screen display, and selected image display, and when screen is displayed in selected image display, recognizes based on the accepted moving body-identifying signal which of the tools T1, T2 is displayed.

As illustrated in FIG. 6, the screen display processor 20 first recognizes from the display-format identifying signal and moving body-identifying signal input through the display format selecting button in which of display formats screen is displayed (and additionally, which of the tools T1, T2 is to be displayed if selected image display is selected) (Step S21), and then recognizes the tools T1, T2 held in the tool rest 36, 38, based on data, received from the drive control unit 13, on the tools T1, T2 held in the tool rests 36, 38, and reads the tree-dimensional modeling data, stored in the modeling data storage 15, for the tools T1, T2, workpiece W, main spindle 32, chuck 33, first saddle 34, second saddle 35, upper tool rest 36, third saddle 37 and lower tool rest 38 (Step S22). It should be understood that in reading modeling data for the tools T1, T2, the screen display processor 20 reads the three-dimensional modeling data for the recognized tools T1, T2.

Subsequently, the screen display processor 20 receives from the move-to point predicting unit 14 the predicted move-to points for the tool rests 36, 38 (Step S23), and generates, based on the read three dimensional modeling data and the received predicted move-to points, three-dimensional modeling data describing the situation in which the first saddle 34, second saddle 35, upper tool rest 36, and tool T1, and the third saddle 37, lower tool rest 38 and tool T2 have been moved into the predicted move-to points (step S24). It should be understood that when the tools T1, T2 and the workpiece W overlap to cerate a cutting portion, the screen display processor 20 calculates the cutting portion to generate the three-dimensional modeling data for the workpiece W so that the cutting portion is edited out of the workpiece W.

After that, for example, comparing the generated three-dimensional modeling data with the three-dimensional modeling data read in Step S22 or the three-dimensional modeling data that will be updated in Step S27 described hereinafter, the screen display processor 20 checks whether or not the tool rests 36, 38 are moving (Step S25). Moreover, when the recognized display format is full-screen display and split-screen display, the screen display processor 20 checks whether or not at least one of the tool rests 36, 38 is moving, and when the recognized display format is the selected image display, the screen display processor 20 checks whether or not that of the tool rests 36, 38 holding either of the tool T1 or T2 to be displayed onscreen.

And, when determining in step S25 that tool rests 36, 38 are not moving, the screen display processor 20 proceeds to Step S28, and when determining in step S25 that the tool rests 36, 38 are moving, the screen display processor 20 generates image data corresponding to the recognized display format to display the image data on the screen display device 47 (refer to FIG. 7 through FIG. 11). Furthermore, in generating image data to be displayed in split-screen display or selected image display, the screen display processor 20 recognizes from the data stored in the display-directing point data storage 19 the display-directing points to generate, based on the recognized display-directing points, the image data. Moreover, although the display-directing points are initially defined at the tips of the tools T1, T2 (refer to FIG. 8 through FIG. 10), the display-directing points are placed, when interference is determined by the interference lookout processor 17, at the points that are defined by the display-directing-point setting processor 18, based on the interference points received from the interference lookout processor 17 (refer to FIG. 11). In addition, FIG. 7 through FIG. 10 illustrate how the tool rests 36, 38 (tools T1, T2) move toward the main spindle 32 (workpiece W).

After that, based on the generated three-dimensional modeling data, the screen display processor 20 updates the three-dimensional modeling data (step S27), and then checks in step S28 whether or not the processes are finished. It they are not finished, the screen display processor 20 repeats the processes in step S23 of later, and when determining that the processes are over, ends the series of the processes.

Furthermore, when receiving the alarm signal from the interference lookout processor 17, the screen display processor 20, for example, blinks the displayed image as an alarm display.

According to the controller 1 configured as above, of this embodiment, the three-dimensional modeling data involving at least the tools T1, T2, workpiece W, main spindle 32, chuck 33, first saddle 34, second saddle 35, upper tool rest 36, third saddle 37 and lower tool rest 38 is stored previously in the modeling data storage 15, and interference data defining interference relationships among the tools T1, T2, workpiece W, main spindle 32, chuck 33, first saddle 34, second saddle 35, upper tool rest 36, third saddle 37 and lower tool rest 38 is stored previously in the interference data storage 16.

Moreover, data on the display-directing points for the tools T1, T2 is stored by the display-directing-point setting processor 18 into the display-directing point data storage 19, based on the input signal through the input device 46.

The feed mechanisms 39, 40, 41, 42, 43 are controlled by the drive control unit 13, based on the operational commands issued by means of the NC program and the manual operation, and as a result, the movement of the tool rests 36, 38 is controlled. At this time, the move-to points for the first saddle 34, second saddle 35, upper tool rest 36, third saddle 37 and lower tool rest 38 are predicted by the move-to point predicting unit 14, and then whether or not interference occurs among the tools T1, T2, workpiece W, main spindle 32, chuck 33, first saddle 34, second saddle 35, upper tool rest 36, third saddle 37 and lower tool rest 38 is checked by the interference lookout processor 17, based on the predicted move-to points, on the command speed, and on the data stored in the modeling data storage 15 and interference data storage 16, and meanwhile the image data corresponding to a display format selected as appropriate is generated by the screen display processor 20, based on the predicted move-to points and on the data stored in the modeling data storage 15 and in the display-directing point data storage 19, and displayed on the screen of the screen display device 47.

In displaying the image data, with the full-screen display being selected from the display formats, image data involving an entire image including the chuck 33, workpiece W, tools T1, T2, part of the tool spindle 36b, and part of the turret 38b is generated and displayed (refer to FIG. 7), and with the split-screen display being selected from the display formats, the image data is generated to be onscreen so that the tips P of the tools T1, T2 coincide with the centers of the split display zones H1, H2 (refer to FIG. 8), and with the selected image display being selected form the display formats, the image data is generated to be onscreen so that a tip P of whichever is chosen from the tools T1, T2 coincides with the center of the onscreen display area H.

When it is determined in the interference lookout that interference will occur, an alarm signal is sent to the drive control unit 13 and the screen display processor 20, and the feed mechanisms 39, 40, 41, 42, 43 are stopped by the drive control unit 13, and then an alarm image is generated by the screen display processor 20, and displayed on the screen of the screen display device 47.

Furthermore, an interference point, on the tool T1, having a probability of interfering with the workpiece W, chuck 33, tool T2, and turret 38b, and an interference point, on the tool T2, having a probability of interfering with the workpiece W, chuck 33, tool T1, and tool spindle 36b, are recognized, and the recognized interference points are sent to the display-directing-point setting processor 18. The display-directing points are defined, based on the recognized interference points, at the interference points on the tools T1, T2, and are stored (updated) in the display-directing point data storage 19, by the display-directing-point setting processor 18. Therefore, image data is generated and displayed on the screen display device 47 so that the interference points P coincide with the centers of the onscreen display area H and display zones H1, H2 (refer to FIG. 11). It should be understood that FIG. 11A illustrates that the tool T1 interferes with the workpiece W.

As just described, the controller 1 of this embodiment has a configuration in which the screen display processor 20 generates image data of a form designed so that the tips (display-directing points) P of the tools T1, T2 coincide with the center of the onscreen display area H of, or with the centers of the split display zones H1, H2 of, the screen display device 47, and displays the image data on the screen of the screen display device 47, so that even if a distance is put between the tools T1, T2 are the workpiece W, the tools T1, T2 are always displayed in the center of the display screen of the screen display device 47, and thus operators can always grasp positional relationship between the tools T1, T2 and the workpiece W, movements of the tools T1, T2, and the progress in machining the workpiece W with the tools T1, T2. Therefore, in such a configuration, the operators can constantly ascertain whether or not the tools T1, T2 and the workpiece W will mutually interfere, and can perform operations with peace of mind.

Furthermore, operators can define the display-directing points for the tools T1, T2 by means of the setting buttons in the input device 46 at anywhere they like, so that usability is improved. In addition, the controller 1 is configured so that when receiving an interference points, on the tool T1, having a probability of interfering with the workpiece W, chuck 33, tool T2, and turret 38b, and on the tool T2, having a probability of interfering with the workpiece W, chuck 33, tool T1 and tool spindle 36b, being recognized and sent when the interference lookout processor 17 determines that interference will occur, the display-directing-point setting processor 18 defines based on the received interference points the display-directing points at the interference points on the tools T1, T2, so that the interference points on the tools T1, T2 can be displayed on the center of the display screen of the screen display device 47, and thus the interference points can be identified more quickly, and the efficiency of the operator's work can be improved.

Moreover, the controller 1 is configured so that whether or not interference will occur among the tools T1, T2, main spindle 32, chuck 33, first saddle 34, second saddle 35, upper tool rest 36, third saddle 37 and lower tool rest 38 is checked, and image data is generated to be onscreen, based on the move-to points, predicted by the move-to point predicting unit 14, and into which the first saddle 34, second saddle 35, upper tool rest 36, third saddle 37, and lower tool rest 38 are moved after a predetermined period of time. In such a configuration, before the first saddle 34, second saddle 35, upper tool rest 36, third saddle 37 and lower tool rest 38 are actually moved, as a result of driving of the feed mechanisms 39, 40, 41, 42, 43 under the control of the drive control unit 13, a probability of interference occurrence can be checked previously, and also positional relationship between the tools T1, T2 and the workpiece W, movements of the tools T1, T2 can be checked. Therefore, in performing various operations, interference occurrence is advantageously prevented.

The above is a description of one embodiment of the present invention, but the specific mode of implementation of the present invention is in no way limited thereto.

The embodiment above presented the NC lathe 30 as one example of the machine tool, but the controller I according to this embodiment can also be provided in a machining center or various other types of machine tools. For example, in a NC lathe from which the lower tool rest 38 is omitted, advantageously the screen display processor 20 may be configured to display in the onscreen display area of the screen display device 47 the chuck 33, workpiece W, tool T1, part of the tool spindle 36b, without accepting through the input device 46 the display-format identifying signal and moving body-identifying signal, as when the tool T1 is selected in selected image display.

Moreover, the screen display processor 20 may be configured to execute the same process as in Step S25, without accepting through the input device 46 the display-format identifying signal and moving body-identifying signal. In such a configuration, the screen display processor 20 checks whether or not both tool rests 36, 38 are moving, and when both are traveling, as in the split-screen display described above, splits the onscreen display area of the screen display device 47 into two display zones H1, H2, and generates image data to display it in the display zones H1, H2 of the screen display device 47 so that the display-directing points P for the tools T1, T2 coincide respectively with the centers of the split display zones H1, H2, and when one of the tool rests 38, 38 is moving, as in the selected image display described above, generates image data to display it on the screen display device 47 so that a display-directing point for the tool T1 or T2 held in that of the tool rests 36, 38 being traveling coincides with the center of the onscreen display area H of the screen display device 47.

Additionally, the screen display processor 20 may be configured to execute, in the split-screen display, the same process as in Step S25, even when accepting from the input device 46 the display-format identifying signal and moving body-identifying signal. In such a configuration, the screen display processor 20 checks whether or not both tool rests 36, 38 are traveling, and when both are traveling, displays screen as described above, and when one of the tool rests 36, 38 is traveling, generates image data to display it on the screen display device 47 so that the display a directing point P for the tools T1 or T2 held in that of the tool rests 36, 38 being moving coincides with the center of the onscreen display area H of the screen display device 47.

Moreover, the three-dimensional modeling data stored in the modeling data storage 15 may be generated by any means, but in order to perform high-precision interference lookout and image data generation, it is preferable to use data that is generated accurately rather than data that is generated simply. And two-dimensional model, as an alternative to the three-dimensional model, may be stored in the modeling data storage 15.

In the example described above, the controller 1 is configured so that the interference lookout processor 17 and screen display processor 20 employs the move-to points, predicted by the move-to point predicting unit 14, of the first saddle 34, second saddle 35 and the upper tool rest 36, third saddle 37 and lower tool rest 38, to generate the three-dimensional modeling data describing the situation in which they have been moved, but there is no limitation on the configuration, so the controller 1 may be configured so that the move-to point predicting unit 14 is omitted and the current points of the first saddle 34, second saddle 35, upper tool rest 36, third saddle 37 and lower tool rest 38 are received from the drive control unit 13 to generate, based on the current points, the three-dimensional modeling data describing the situation in which they have been moved.

Additionally, in above example, as illustrated in FIG. 7 through FIG. 11, the controller 1 is configured so that the chuck 33, workpiece W, tools T1, T2, part of the tool spindle 36, and part of the turret 38 are displayed onscreen, but this configuration is one example, display mode is not limited to it. For example, acceptable is a configuration in which the tool rests 36, 38 are entirely displayed, and the first saddle 34, second saddle 35, third saddle 37, main spindle 32, and (not-illustrated) headstock are also displayed.

Furthermore, as illustrated in chain double-dashed line in the split-screen display illustrated in FIG. 8 and in selected image display illustrated in FIG. 9 or FIG. 10, an image of the tool T2 may be added to the image of the tool T1 and vice versa.

Moreover, in above example, the display-directing points are the tips of the tools T1, T2, but the display-directing points are not limited to them. When the tool rest 36, 38, first saddle 34, second saddle 35, and third saddle 37 are also displayed on the screen display device 47, the display-directing points may be defined at, for example, their edge face and their center of gravity, and at center of gravity in the structural element including the tool rests 36, 38 and tools T1, T2. Additionally, feasible is a configuration in which the display-directing-point setting processor 18 is automatically define the display-directing points, depending on the shapes of the tools T1, T2, tool rests 36, 38, first saddle 34, second saddle 35 and third saddle 37.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A controller provided in a machine tool furnished with a single moving body, with a feed mechanism for driving the moving body to move it, with at least one structural element arranged within the region in which the moving body can move, and with a screen display means for displaying image data, the machine-tool controller comprising:
   a control execution processing unit controlling, based on an operational command for the moving body, actuation of the feed mechanism to control at least a move-to point for the moving body;
   a modeling data storage storing modeling data relating to two-dimensional as well as three-dimensional models of, and including at least geometry data defining shapes of, the moving body and structural element;
   a screen display processor receiving the moving body move-to point from said control execution processing unit to generate, based on the received move-to point and on the modeling data stored in the modeling data storage, data modeling the situation in which the moving body has been moved into the move-to point, and for generating in accordance with the generated modeling data, and having the screen display means display onscreen, two-dimensional or three-dimensional image data;
   a display-directing-point setting processor executing a process of defining a display-directing point being defined for the moving body and being a position serving as referent when the moving body is displayed onscreen; and
   a display-directing point data storage storing data relating to the display-directing point defined by said display-directing-point selling processor; wherein
   in generating image data to be displayed onscreen, said screen display processor is configured to generate and onscreen-display the image data in such a manner that the display-directing point stored in said display-directing point data storage coincides with the central position of the onscreen display area of the screen display means, and
   an interference lookout processor receiving from said control execution processing unit the move-to point for the moving body, for generating, based on the received move-to point and on the modeling data stored in said modeling data storage, data modeling the situation in which the moving body is moved into the move-to point, and checking whether the moving body and structural element will interfere with each other, and when determining that they will, for recognizing from the generated modeling data a location on the moving body, where it will interfere with the structural element, and transmitting the recognized interference location to said display-directing-point setting processor and transmitting an alarm signal to said control execution processing unit; wherein
   said display-directing-point setting processor is configured in such a manner that on receiving the interference location from said interference lookout processor, said display-directing-point setting processor updates the data relating to the display-directing point stored in said display-directing point data storage so that the received interference location becomes the display-directing point; and
   said control execution processing unit is configured in such a manner that on receiving the alarm signal from said interference lookout processor, said control execution processing unit halts movement of the moving body.

2. A machine-tool controller as set forth in claim 1, further comprising a move-to point predicting unit for receiving from said control execution processing unit at least a current point of the moving body, to predict from the received current point the move-to point to which the moving body will have moved after elapse of a predetermined period of time; wherein
   said screen display processor and said interference lookout processor are configured to, in generating data modeling the situation in which the moving body has been moved, receive from said move-to point predicting unit the predicted move-to point for the moving body, and generate, based on the received predicted move-to point and on the modeling data stored in said modeling data storage, data modeling the situation in which the moving body has been moved into the predicted move-to point.

3. A controller provided in a machine tool furnished with a plurality of moving bodies, with a feed mechanism for driving the moving bodies to move them, with one or more structural elements arranged within the regions in which the moving bodies can move, and with a screen display means for displaying image data, the machine-tool controller comprising:
   a control execution processing unit controlling, based on operational commands for the moving bodies, actuation of the feed mechanism to control at least move-to points for the moving bodies;
   a modeling data storage storing modeling data relating to two-dimensional as well as three-dimensional models of, and including at least geometry data defining shapes of, the moving bodies and one or more structural elements;
   a screen display processor receiving the moving-body move-to points from said control execution processing unit to generate, based on the received move-to points and on the modeling data stored in the modeling data storage, data modeling the situation in which the moving bodies have been moved into the move-to points, and for generating in accordance with the generated modeling data, and having the screen display means display onscreen, two-dimensional or three-dimensional image data;

a display-directing-point setting processor executing a process of defining display-directing points being defined respectively for the moving bodies and being positions serving as referents when the moving bodies are displayed onscreen; and a display-directing point data storage storing data relating to the display-directing points of the moving bodies defined by said display-directing-point selling processor; wherein said screen display processor is configured to, in generating image data to be displayed onscreen, check among the plurality of moving bodies for moving bodies that are in motion, based on the generated modeling data, and where having confirmed moving bodies in motion to be a plurality, to divide an onscreen display area of the screen display means into a plurality of display zones in such a manner that the moving bodies confirmed to be in motion are respectively displayed, and to generate and onscreen-display the image data in such a manner that the central positions of the divided display zones coincide respectively with the display-directing points of the moving bodies to be displayed in the display zones stored in said display-directing point data storage; and said screen display processor is configured to, where having confirmed moving bodies in motion to be one, generate and onscreen-display the image data in such a manner that the central position of the onscreen display area of the screen display means coincides with the display-directing point of the moving body stored in said display-directing point data storage.

4. A machine-tool controller as set forth in claim 3, further comprising an interference lookout processor receiving from said control execution processing unit the move-to points for the moving bodies, for generating, based on the received move-to points and on the modeling data stored in said modeling data storage, data modeling the situation in which the moving bodies are moved into the move-to points, and checking whether the moving bodies and structural elements will interfere with each other, and when determining that they will, for recognizing from the generated modeling data locations on the moving bodies, where they will interfere with the structural elements, and transmitting the recognized interference locations to said display-directing-point setting processor and transmitting an alarm signal to said control execution processing unit; wherein said display-directing-point setting processor is configured in such a manner that on receiving the interference locations from said interference lookout processor, said display-directing-point setting processor updates the data relating to the display-directing points stored in said display-directing point data storage so that the received interference locations of the moving bodies become the display-directing points thereof; and said control execution processing unit is configured in such a manner that on receiving the alarm signal from said interference lookout processor, said control execution processing unit halts movement of the moving bodies.

5. A machine-tool controller as set forth in claim 3, further comprising a move-to point predicting unit receiving from said control execution processing unit at least current points of the moving bodies, to predict from the received current points the move-to points to which the moving bodies will have moved after elapse of a predetermined period of time; wherein said screen display processor and said interference lookout processor are configured to, in generating data modeling the situation in which the moving bodies have been moved, receive from said move-to point predicting unit the predicted move-to points for the moving bodies, and generate, based on the received predicted move-to points and on the modeling data stored in said modeling data storage, data modeling the situation in which the moving bodies have been moved into the predicted move-to points.

6. A controller provided in a machine tool furnished with a plurality of moving bodies, with a feed mechanism for driving the moving bodies to move them, with one or more structural elements arranged within the regions in which the moving bodies can move, and with a screen display means for displaying image data, the machine-tool controller comprising:

a control execution processing unit controlling, based on operational commands for the moving bodies, actuation of the feed mechanism to control at least move-to points for the moving bodies;

a modeling data storage storing modeling data relating to two-dimensional as well as three-dimensional models of, and including at least geometry data defining shapes of, the moving bodies and one or more structural elements;

a screen display processor receiving the moving-body move-to points from said control execution processing unit to generate, based on the received move-to points and on the modeling data stored in the modeling data storage, data modeling the situation in which the moving bodies have been moved into the move-to points, and for generating in accordance with the generated modeling data, and having the screen display means display onscreen, two-dimensional or three-dimensional image data;

a display-directing-point selling processor executing a process of defining display-directing points being defined respectively for the moving bodies and being positions serving as referents when the moving bodies are displayed onscreen; and a display-directing point data storage storing data relating to the display-directing points of the moving bodies defined by said display-directing-point selling processor; wherein said screen display processor is configured to receive from outside the processor a display-format identifying signal concerning in which display format the display images that are onscreen-displayed on the screen display means are displayed—a first display format by which each of the plurality of moving bodies is onscreen-displayed on the screen display means, or a second display format by which a single of the moving bodies is onscreen-displayed on the screen display means—and when displaying in the second display format to receive from outside the processor a moving-body identifying signal concerning which of the moving bodies is to be displayed; and said screen display processor is configured to, in generating and onscreen-displaying the image data, recognize, from the display-format identifying signal, in which of the display formats to display the image data, and when the recognized display format is the first display format, to divide an onscreen display area of the screen display means into a plurality of display zones in which each of the moving bodies may respectively be displayed, and to generate and onscreen-display the image data in such a manner that the central positions of the divided display zones coincide respectively with the display-directing points of the moving bodies to be displayed in the display zones stored in said display-directing point data storage, and when the recognized display format is the second display format, further to recognize, from the moving-body identifying signal, which of the moving bodies is to be displayed, and to generate and onscreen-display the image data in such a manner that the central position of the onscreen display area of the screen display means coincides with the display-directing point of the moving body to be displayed stored in said display-directing point data storage.

7. A machine-tool controller as set forth in claim 6, further comprising an interference lookout processor receiving from said control execution processing unit the move-to points for the moving bodies, for generating, based on the received move-to points and on the modeling data stored in said modeling data storage, data modeling the situation in which the moving bodies are moved into the move-to points, and checking whether the moving bodies and structural elements will interfere with each other, and when determining that they will, for recognizing from the generated modeling data locations on the moving bodies, where they will interfere with the structural elements, and transmitting the recognized interference locations to said display-directing-point setting processor and transmitting an alarm signal to said control execution processing unit; wherein said display-directing-point setting processor is configured in such a manner that on receiving the interference locations from said interference lookout processor, said display-directing-point setting processor updates the data relating to the display-directing points stored in said display-directing point data storage, so that the received interference locations of the moving bodies become the display-directing points thereof; and said control execution processing unit is configured in such a manner that on receiving the alarm signal from said interference lookout processor, said control execution processing unit halts movement of the moving bodies.

8. A machine-tool controller as set forth in claim 6, further comprising a move-to point predicting unit for receiving from said control execution processing unit at least current points of the moving bodies, to predict from the received current points the move-to points to which the moving bodies will have moved after elapse of a predetermined period of time; wherein said screen display processor and said interference lookout processor are configured to, in generating data modeling the situation in which the moving bodies have been moved, receive from said move-to point predicting unit the predicted move-to points for the moving bodies, and generate, based on the received predicted move-to points and on the modeling data stored in said modeling data storage, data modeling the situation in which the moving bodies have been moved into the predicted move-to points.

\* \* \* \* \*